(12) United States Patent
Egusa

(10) Patent No.: US 9,434,340 B2
(45) Date of Patent: Sep. 6, 2016

(54) OCCUPANT PROTECTION DEVICE FOR CASE OF VEHICLE SIDE COLLISION

(71) Applicant: TOYOTA JIDOSHA KABUSHIKI KAISHA, Toyota-shi, Aichi-ken (JP)

(72) Inventor: Shinobu Egusa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/587,837

(22) Filed: Dec. 31, 2014

(65) Prior Publication Data

US 2015/0203065 A1    Jul. 23, 2015

(30) Foreign Application Priority Data

Jan. 20, 2014   (JP) ................... 2014-008006

(51) Int. Cl.

| | |
|---|---|
| *B60R 21/20* | (2011.01) |
| *B60R 7/04* | (2006.01) |
| *B60R 21/231* | (2011.01) |
| *B60N 2/46* | (2006.01) |
| *B60N 2/42* | (2006.01) |
| *B60R 21/02* | (2006.01) |
| *B60R 21/08* | (2006.01) |

(52) U.S. Cl.
CPC .............. *B60R 21/20* (2013.01); *B60N 2/4235* (2013.01); *B60N 2/4606* (2013.01); *B60N 2/4686* (2013.01); *B60R 7/04* (2013.01); *B60R 21/02* (2013.01); *B60R 21/23138* (2013.01); *B60R 21/08* (2013.01); *B60R 2021/0213* (2013.01); *B60R 2021/0273* (2013.01); *B60R 2021/23161* (2013.01)

(58) Field of Classification Search
CPC ......... B60R 7/04; B60R 21/20; B60R 21/02; B60R 21/08; B60R 21/23138; B60R 2021/0273; B60R 2021/0213; B60R 2021/23161; B60N 3/12; B60N 2/468
See application file for complete search history.

(56) References Cited

U.S. PATENT DOCUMENTS

| | | | | |
|---|---|---|---|---|
| 5,222,761 | A * | 6/1993 | Kaji ..................... | B60R 21/017 280/730.2 |
| 7,641,252 | B2 * | 1/2010 | Sturt ..................... | B60N 2/468 296/24.34 |
| 7,878,567 | B2 * | 2/2011 | Schneider ............ | B60N 2/4646 296/24.34 |
| 2007/0158979 | A1 * | 7/2007 | Saberan ............. | B60N 2/01558 297/47 |
| 2008/0129020 | A1 | 6/2008 | Bostrom et al. | |
| 2008/0129024 | A1 * | 6/2008 | Suzuki ............. | B60R 21/23138 280/734 |

FOREIGN PATENT DOCUMENTS

| | | |
|---|---|---|
| JP | 2008-126783 A | 6/2008 |
| JP | 2008-143272 A | 6/2008 |
| JP | 2008542100 A | 11/2008 |
| JP | 2010052620 A | 3/2010 |

(Continued)

*Primary Examiner* — Darlene Condra
(74) *Attorney, Agent, or Firm* — Oliff PLC

(57) ABSTRACT

A occupant protection device for a case of a vehicle side collision includes: a center console which is provided on a side of a vehicular seat and at a central portion of a vehicle compartment in the vehicle width direction and in which a console box opposing an abdomen of an occupant seated in the vehicular seat in the vehicle width direction is movable to a retraction position where the console box does not oppose the abdomen in the vehicle width direction; and a moving device which when a vehicle side collision is detected or predicted, moves the console box to the retraction position.

20 Claims, 19 Drawing Sheets

(56) References Cited

FOREIGN PATENT DOCUMENTS

| JP | 2010120411 | A | * | 6/2010 |
| JP | 2010-143233 | A |   | 7/2010 |
| JP | 2010-234886 | A |   | 10/2010 |
| JP | 2011-046308 | A |   | 3/2011 |
| JP | 2014076703 | A | * | 5/2014 |

* cited by examiner

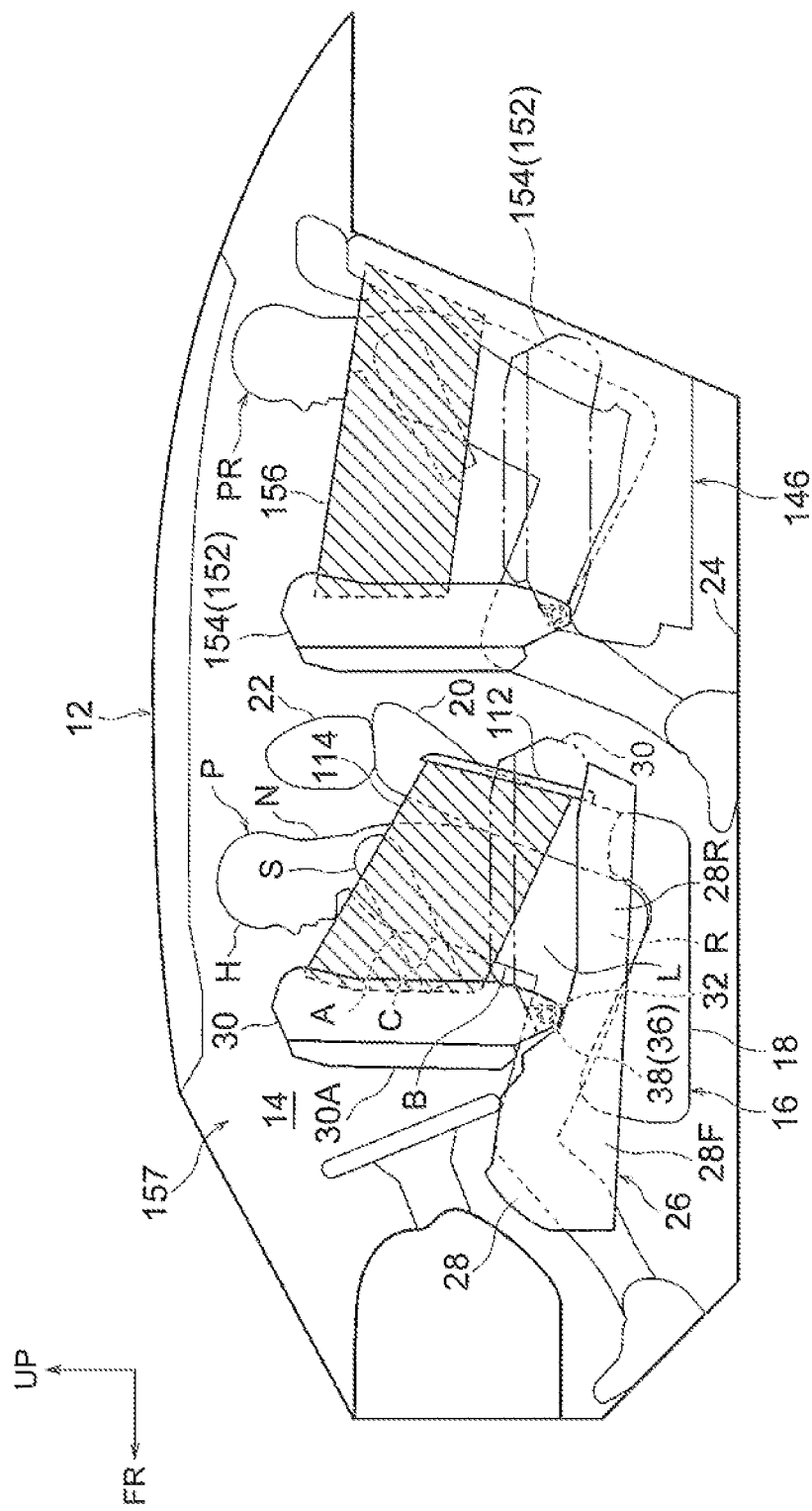

OCCUPANT PROTECTION DEVICE FOR CASE OF VEHICLE SIDE COLLISION

INCORPORATION BY REFERENCE

The disclosure of Japanese Patent Application No. 2014-008006 filed on Jan. 20, 2014 including the specification, drawings and abstract is incorporated herein by reference in its entirety.

BACKGROUND OF THE INVENTION

1. Field of the Invention

The present invention relates to an occupant protection device for a case of a vehicle side collision.

2. Description of Related Art

In an occupant protection device for a vehicle described in Japanese Patent Application Publication No. 2008-143272 (JP 2008-143272 A), when a vehicle side collision is predicted, a center console is moved upward of the vehicle and forward of the vehicle with respect to a seat where the occupant is seated. As a result, the occupant is restrained from moving in a vehicle width direction.

However, the above-described occupant protection device has a possibility that a body part near the abdomen of an occupant who is about to move by inertia to an impact part side (hereinafter referred to as impact side) at the time of a side collision may interfere with a center console which has been moved upward of the vehicle. As a result, it is considered that a load may be applied to the abdomen or the like of the occupant and therefore, there is a room for improvement in intensifying occupant protection performance.

SUMMARY OF THE INVENTION

The present invention provides an occupant protection device for a case of a vehicle side collision which can contribute to improvement of occupant protection performance.

A first aspect of the present invention relates to an occupant protection device for a case of a vehicle side collision. The occupant protection device for a case of a vehicle side collision includes: a center console which is provided on a side of a vehicular seat and at a central portion of a vehicle compartment in the vehicle width direction and in which a console box opposing the abdomen of an occupant seated in the vehicular seat in the vehicle width direction is movable to a retraction position where the console box does not oppose the abdomen in the vehicle width direction; and a moving device which when a vehicle side collision is detected or predicted, moves the console box to the retraction position.

In the meantime, in the above-described aspect, a positional relationship between the abdomen of the occupant and the console box is set up using a dummy of the AM 50 (50 percentile of US adult male). As the dummy, for example, World SID (World Side Collision Dummy: World Side Impact Dummy) is used. Further, At the time of the above-described setting, it is assumed that the position of a vehicular seat with respect to a vehicle body is adjusted to a position specified by the side collision test.

In the above-described aspect, when a vehicle side collision is detected or predicted, the console box of the center console is moved to a retraction position by a moving device. As a result, it comes that the console box does not oppose the abdomen of the occupant in the vehicle width direction and thus, when the occupant moves by inertia to a central side in the vehicle width direction due to an impact of a side collision, the abdomen of the occupant can be inhibited from interfering with the console box. Consequently, this can contribute to improvement of occupant protection performance.

As described above, the occupant protection device for a case of a vehicle side collision according to the first aspect of the present invention can contribute to improvement of the occupant protection performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 19 is a longitudinal sectional view of a structure of a vehicle compartment of a vehicle to which a fourth modification of the occupant protection device according to the tenth embodiment of the present invention is applied when viewed from the left side of the vehicle or a diagram corresponding to FIG. 14.

DETAILED DESCRIPTION OF EMBODIMENTS

First Embodiment

A occupant protection device 10 for a case of a vehicle side collision according to the first embodiment of the present invention (hereinafter referred to simply as occupant protection device) will be described with reference to FIGS. 1 to 4. An arrow FR, an arrow UP, and an arrow OUT marked as required in each drawing indicate forward of a vehicle (advance direction), upward of the vehicle and outward in the vehicle width direction, respectively. In following descriptions using just the front-rear direction, the right-left direction or the up-down direction unless specified otherwise, it is assumed that they indicate front and rear in the vehicle front-rear direction, right and left in the vehicle right-left direction (vehicle width direction) and up and down in the vehicle up-down direction respectively.

(Structure)

Figure 1:
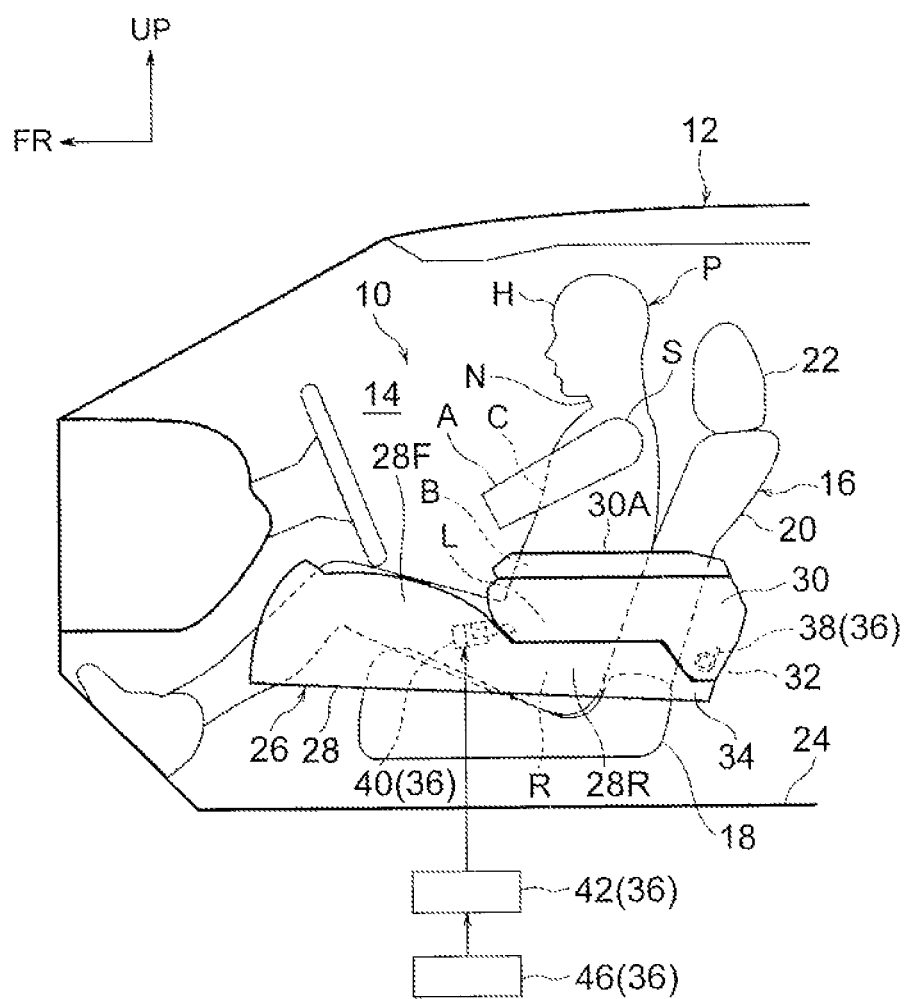
FIG. 1 is a longitudinal sectional view of a structure of a vehicle compartment front portion of a vehicle to which an occupant protection device for a case of a vehicle side collision according to a first embodiment of the present invention is applied when viewed from the left side of the vehicle.
Figure 2:
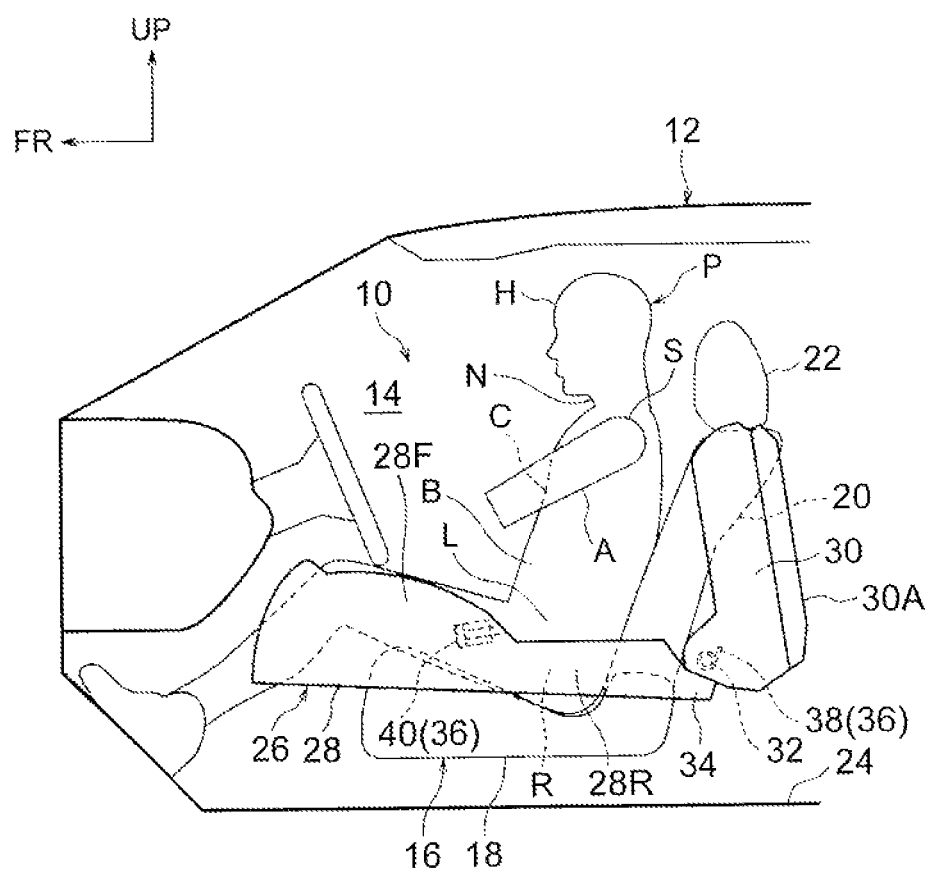
FIG. 2 is a longitudinal sectional view corresponding to FIG. 1 showing a state in which the console box is moved to its retraction position in the occupant protection device according to the first embodiment of the present invention.

As shown in FIG. 1 and FIG. 2, a front seat 16 is arranged at a front portion of a vehicle compartment 14 of an automobile 12 (vehicle) to which an occupant protection device 10 is applied as a vehicular seat. It is assumed that the front seat 16 is a so-called driver's seat of a right-hand-drive vehicle and includes a seat cushion 18 in which an occupant P is seated, a seat back 20 which serves as a backrest for the occupant P, and a head rest 22 which supports the head H of the occupant P.

In the meantime, it is assumed that the occupant P shown in FIGS. 1 to 4 has a similar physique to the AM50 (50 percentile of US adult male) based on, for example, World SID (World Side collision Dummy: World Side impact Dummy).

The above-described front seat 16 is provided with known various position adjusting mechanisms for adjusting a position of each portion with respect to a vehicle body. For example, the seat cushion 18 is connected to a vehicle body floor portion 24 (floor panel) via a seat slide mechanism (not shown) and a lifter mechanism (not shown) to adjust a front-rear position and an up-down position thereof with respect to the vehicle body floor portion 24. For example, the seat cushion 18 is further provided with a tilt mechanism (not shown) which can adjust a tilt angle of a seat surface. Further, a bottom end portion of the seat back 20 is connected to a rear end portion of the seat cushion 18 via a reclining mechanism (not shown) so that a reclining angle of the seat back 20 with respect to the seat cushion 18 can be adjusted. In the meantime, the above-described respective mechanisms are an example and the present invention is not restricted to the above-described example.

A center console 26 is arranged on a side of the front seat 16 and at a central portion of a vehicle compartment 14 in the vehicle width direction. The center console 26 includes a console main body portion 28 which is a thing portion fixed to the vehicle body floor portion 24 and a console box 30 attached to the top of a rear portion 28R of the console main body portion 28.

The console main body portion 28 is arranged above a floor tunnel 24A (see FIG. 3) provided at a central portion of the vehicle body floor portion 24 in the vehicle width direction and fixed to the floor tunnel 24A via a bracket (not shown). The console main body portion 28 is set up such that the height dimension of the rear portion 28R is smaller than that of a front portion 28F. The rear portion 28R of the console main body portion 28 is set up so that a height dimension h1 (see FIG. 3) from a seating referential point (hereinafter referred to as SRP) is, for example, 90 mm or less and opposes a buttock R of the occupant P in the vehicle width direction.

In the meantime, the above-mentioned SRP is a position corresponding, to a hip point of the occupant P when the front seat 16 is adjusted to a designed standard position by means of the above-described various position adjusting mechanisms. Generally, this is set up first on planning stage of the vehicle and serves as a home position of the vehicle. In the present embodiment, the position of the front seat 16 with respect to the vehicle body is adjusted to a position determined through a side collision test and at the determined position, the height of the hip point of the occupant P with respect to the vehicle body floor portion 24 is assumed to coincide with or substantially coincide with the height of the SRP with respect to the vehicle body floor portion 24.

The console box 30 includes a console box which can be opened/closed by means of a door portion 30A and a bottom end portion at a rear end portion thereof is connected to a rear end portion of the console main body portion 28 via a connecting, shaft 32. The connecting shaft 32 is provided such that its axial direction is along the vehicle width direction and it is assumed that the console box 30 can move (rotate) about the connecting shaft 32 between the normal position shown in FIG. 1 and the retraction position shown in FIG. 2 with respect to the console main body portion 28. When the console box 30 moves from the normal position shown in FIG. 1 to the retraction position shown in FIG. 2, a stopper portion 34 provided at the rear end portion of the console main body portion 28 comes into contact with the rear end portion of the console box 30. As a result, the console box 30 is constructed to be restricted from rotating further to a vehicle rear side.

When the console box 30 is located at the normal position shown in FIG. 1, the console box 30 opposes the abdomen B and the waist L of the occupant P in the vehicle width direction (so that they overlap each other when seen from the vehicle side). On the other hand, when the console box 30 is moved to the retraction position shown in FIG. 2, the console box 30 is arranged backward of the vehicle with respect to the occupant P. In this state, the console box 30 never opposes any one of the head H, the neck N, the shoulder S, the upper arm A, the chest C, the abdomen B, the waist L and the buttock R in the vehicle width direction (so that they never overlap each other when seen from the vehicle side).

At the normal time, the above-described console box 30 is restrained at the normal position by a moving device 36 and when a side collision of the automobile 12 is detected or predicted, the console box 30 is moved by the moving device 36 from the normal position to the retraction position. This moving device 36 is provided with a helical coil spring 38 (urging member) for moving the console box 30 from the normal position to the retraction position. The helical coil spring 38 is mounted on the above-described connecting shaft 32 and stretched between the console box 30 and the console main body portion 28 to urge the console box 30 to the retraction position.

The moving device 36 is provided with a locking device 40 attached to the front portion 28F of the console main body portion 28. The locking device 40 is constituted of a lock pin (locking portion) which engages with the console box 30 located at the normal position and a drive source (drive device) for driving the lock pin. The drive source is assumed to be a cylinder unit using, for example, a micro gas generator and retracts the lock pin forward of the vehicle with a drive force to release the above-mentioned engagement state. As a result, the restraint of the console box 30 at the normal position is released so that the console box 30 is rotated to the retraction position by an urging force of the helical coil spring 38.

As shown in FIG. 1, a side collision ECU 42 (control device) mounted on a vehicle is electrically connected to the drive source of the above-described locking device 40. A side collision sensor 46 for detecting a side collision of the vehicle is electrically connected to the side collision ECU 42. The side collision ECU 42 and the side collision sensor 46 are components of the moving device 36.

It is assumed that the side collision ECU 42 is configured to activate (start) the locking device 40 when the side collision ECU 42 detects a side collision of a vehicle (that a side collision is unavoidable) based on a signal from the side collision sensor 46. Speaking in detail, because the front seat 16 of the present embodiment is a driver's seat of a right-hand-drive vehicle, when the side collision ECU 42 detects that another vehicle collides with a side portion (left side portion whose representation is omitted) on the side of an occupant seat of the automobile 12, the locking device 40 is activated. In the meantime, if a pre-crush sensor for predicting (foreseeing) a side collision is electrically connected to the side collision ECU 42, when the side collision ECU 42 predicts a side collision based on a signal from the pre-crush sensor, the locking device 40 may be activated.

(Operation and Effect)

Next, an operation and effect of the first embodiment will be described.

Figure 3:
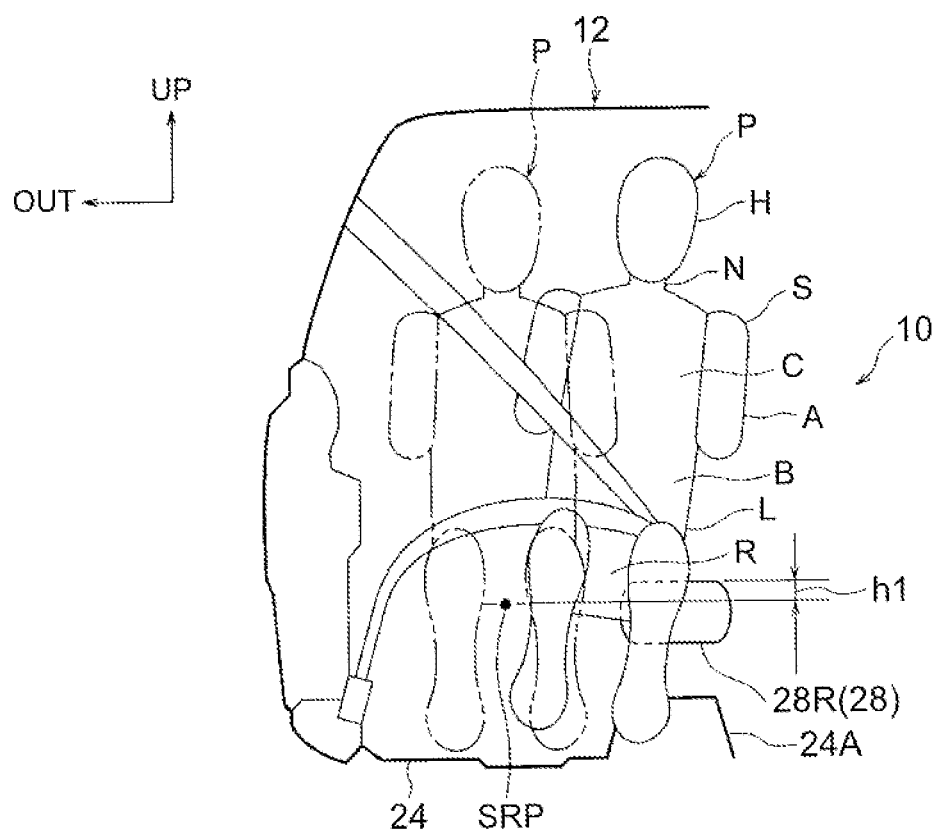
FIG. 3 is a longitudinal sectional view of a structure of a right side portion of the vehicle of the vehicle compartment front portion according to the first embodiment of the present invention when viewed from forward of the vehicle or a diagram for describing a behavior of the occupant upon a side collision in the first embodiment.

In the occupant protection device 10 having the above-described structure, when a side collision of the automobile 12 is detected or predicted, the locking device 40 is activated so that the restraint of the console box 30 by the locking device 40 is released. As a result, the console box 30 is moved by the urging force of the helical coil spring 38 from the normal position to the retraction position. Consequently, it follows that the console box 30 never opposes the abdomen B of the occupant P in the vehicle width direction. Thus, as shown in FIG. 3, when the occupant P moves by inertia to the central side in the vehicle width direction due to an impact of the side collision, the abdomen B can be inhibited from interfering with (contacting: colliding with) the console box 30. This can contribute to improvement of the occupant protection performance.

Figure 4:
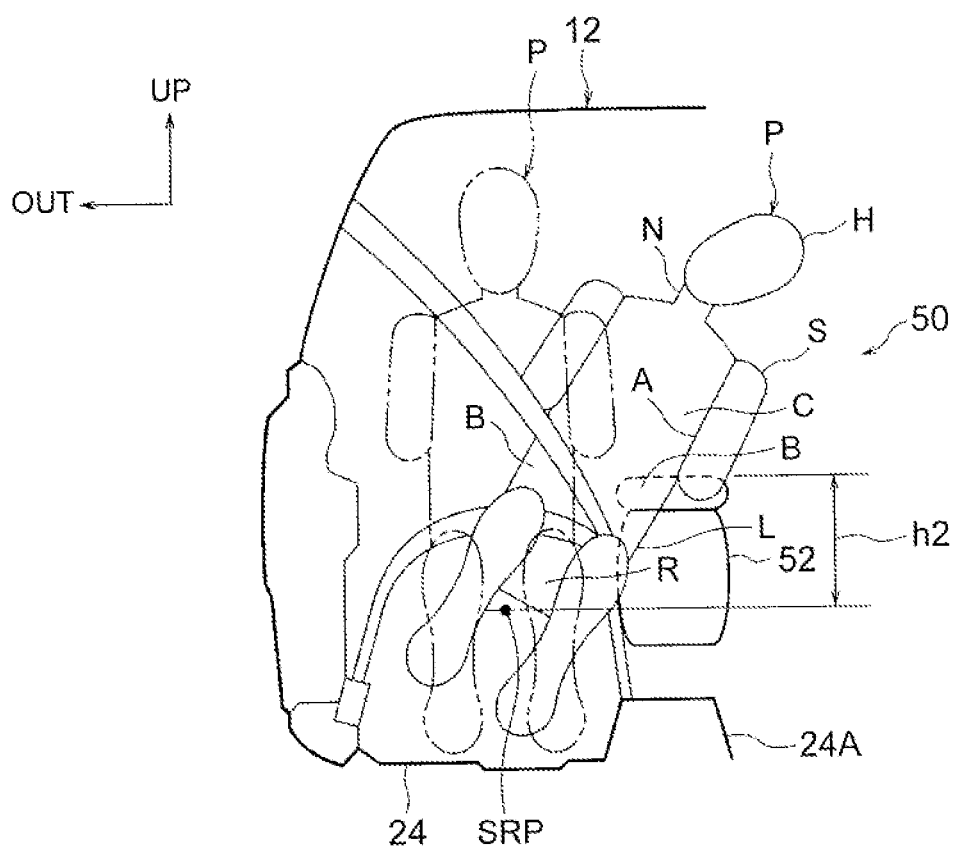
FIG. 4 is a longitudinal sectional view corresponding to FIG. 3 for describing the behavior of the occupant upon a side collision in a comparative example.

The above-described effect will be described in detail using a comparative example 50 shown in FIG. 4. In this comparative example 50, a console box 52 is assumed to be an ordinary one and a height dimension h2 from the SRP up to a top surface thereof is set in a range of, for example, 165 mm to 218 mm. This height dimension h2 is set up based on, for example, comfort of the occupant P in the case when the console box 52 is used as an arm rest, storage capacity of the console box 52 and operability when the occupant P operates a switch provided on the console box 52 without moving his upper body.

When the left side portion of a vehicle relating to this comparative example 50 undergoes a side collision, a body part near the abdomen B of the occupant P who is about to move by inertia to the central side in the vehicle width direction interferes with the console box 52 and a body part of the occupant P above the console box 52 is accelerated quickly to a collision side. Although it is considered that, as a result, a load may be applied to the abdomen B and the chest C of the occupant P, the present embodiment can avoid this phenomenon.

Further, in the comparative example 50, when the occupant P is accelerated quickly as described above, a load is applied to the head H and the neck N of the occupant P. In this regard, because the height dimension h2 of the rear portion 28R of the console main body portion 28 is set low in the present embodiment, the load applied to the head H and the neck N can be reduced. That is, because the height dimension h2 is set to 90 mm or less, the buttock R of the occupant P who is about to move by inertia to the central side in the vehicle width direction rides over the rear portion 28R of the console main body portion 28 easily. As a result, the occupant P can be inhibited from being accelerated quickly like the comparative example 50 and therefore, the load applied to the head H and the neck N can be reduced.

Further, because in the present embodiment the console box 30 is connected rotatably to the console main body portion 28, the connecting portion between the console box 30 and the console main body portion 28 can be constructed with a simple structure.

Next, other embodiment of the present invention will be described. In the meantime, regarding basically the same configuration and operation as the first embodiment, description thereof is omitted while the same reference numerals as the first embodiment are attached.

Second Embodiment

Figure 5:
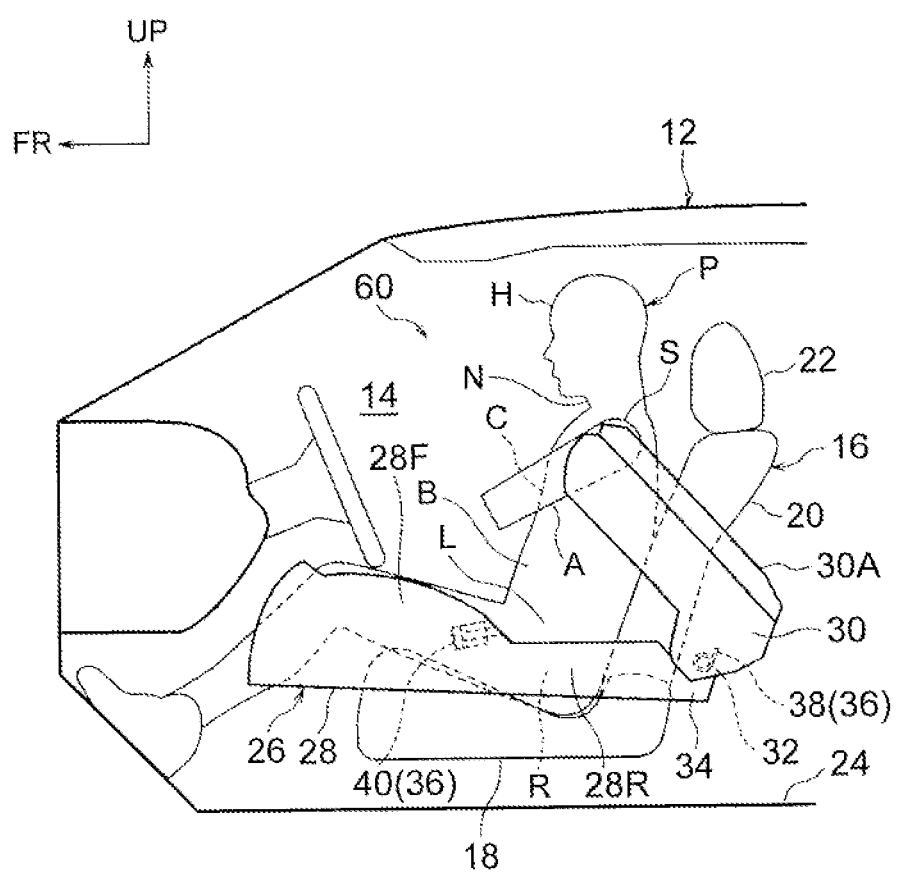
FIG. 5 is a longitudinal sectional view of a structure of a vehicle compartment front portion of a vehicle to which an occupant protection device for a case of a vehicle side collision according to a second embodiment of the present invention is applied when viewed from the left side of the vehicle or a diagram corresponding to FIG. 2.

FIG. 5 shows a structure of a vehicle compartment front portion of the automobile 12 to which an occupant protection device for a case of a vehicle side collision 60 according to the second embodiment of the present invention is applied through a longitudinal sectional view when viewed from the left side of the vehicle. In the present embodiment, the shape of the stopper portion 34 and the like is set up so that the console box 30 located at the retraction position does not oppose the abdomen B of the occupant P in the vehicle width direction but opposes the shoulder S of the occupant P in the vehicle width direction. Other structure is the same as the first embodiment.

In the present embodiment, when the occupant P moves to the central side in the vehicle width direction due to an impact of the side collision, the shoulder S having a higher load tolerance relative to the abdomen B and the chest C can be restrained by the console box 30. As a result, this can contribute further to improvement of the occupant protection performance. In the case when a so-called far side airbag device is loaded on a side portion on the central side of the seat back 20 in the vehicle width direction, the far side airbag which is inflated and expanded upon a side collision may be interposed between the shoulder S of the occupant P and the console box 30. As a result, the console box 30 can be used as a reaction force member of the far side airbag, and thereby the restraining performance of the far side airbag can be improved.

Third Embodiment

Figure 6:
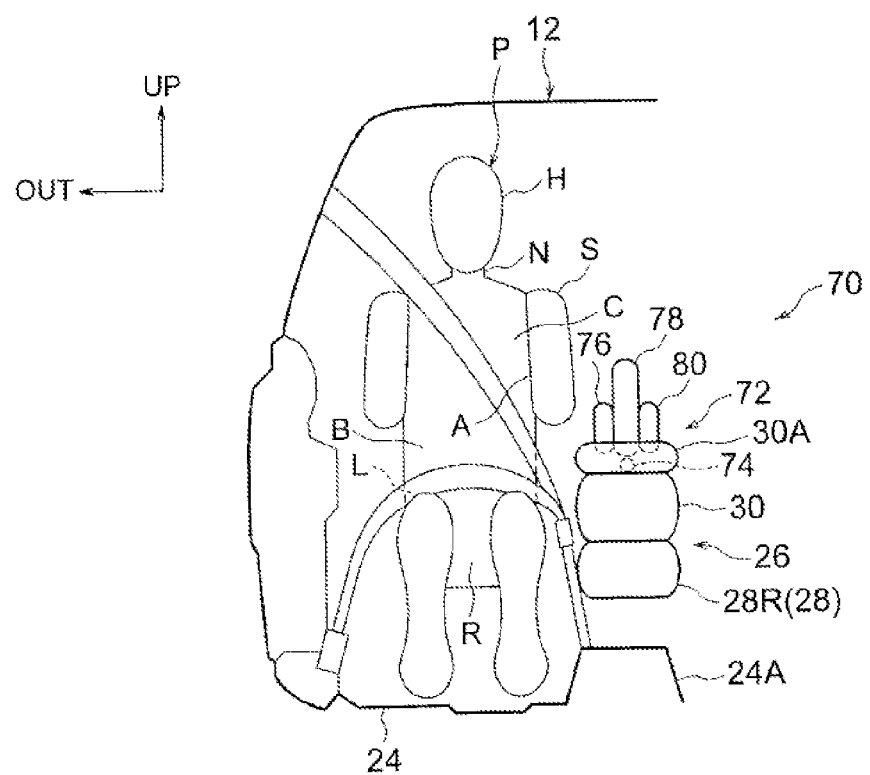
FIG. 6 is a longitudinal sectional view of a structure of a vehicle right side portion of a vehicle compartment front portion of a vehicle to which an occupant protection device for a case of a vehicle side collision according to a third embodiment of the present invention is applied when viewed from forward of the vehicle.

FIG. 6 shows a structure of a vehicle right side portion of the vehicle compartment of the automobile 12 to which an occupant protection device for a case of a vehicle side collision 70 according to the third embodiment of the present invention is applied through a longitudinal sectional view when viewed from forward of the vehicle. In the present embodiment, the door portion 30A of the console box 30 is loaded with (accommodates) an airbag device 72. The airbag device 72 includes an inflator 74 and three airbags 76, 78, 80 which are to be inflated and expanded through a top surface of the door portion 30A with gas generated by the inflator 74. The three airbags 76, 78, 80 are arranged in line in the vehicle width direction and the height dimension of the airbag 78 in the center in the vehicle width direction is set higher than the airbags 76 and 80 on both sides.

The side collision ECU 42 (whose representation is omitted in FIG. 6) is electrically connected to the above-described inflator 74 and when the side collision ECU 42 detects or predicts that the left side portion of the automobile 12 undergoes a side collision, the inflator 74 is activated. A timing of activating the inflator 74 is set to be equal to or slightly earlier than a timing of activating the locking device 40 (whose representation is omitted in FIG. 6). Further, when the inflator 74 is activated, the airbag 78 in the center in the vehicle width direction is configured to be inflated and expanded earlier than the airbags 76 and 80 on both sides. Other configuration than described above of the present embodiment is the same as the first embodiment.

In the present embodiment, before the console box 30 is moved to the retraction position, the arm A of the occupant P can be displaced (swept) to the occupant P side with respect to the console box 30 or forward of the vehicle by the airbags 76, 78, 80 being inflated and expanded. Thus, the arm A can be inhibited from interfering with the console box 30 moving to the retraction position carelessly. That is, the airbag device 72 is a component which is designed as an arm sweeping means for sweeping the arm A of the occupant P out of a moving range of the console box 30. The arm sweeping means may be any type as long as the above-described effect can be obtained and may be other than the airbag device 72.

Figure 7:
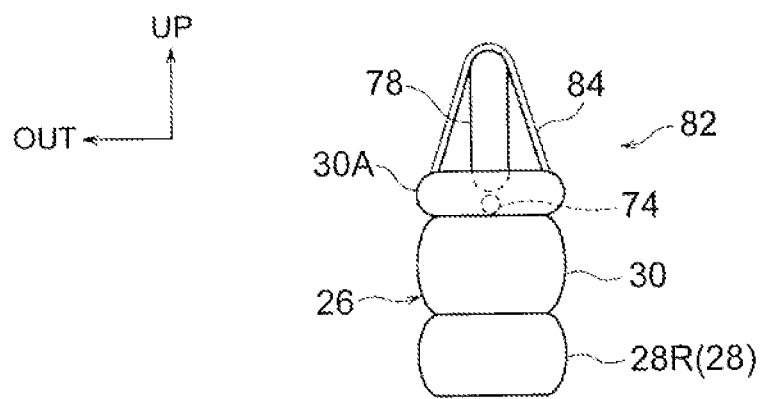
FIG. 7 is a front view of a modification of a center console according to the third embodiment of the present invention when viewed from forward of the vehicle.

Even if the head H or the like of the occupant P is located at an inappropriate position over the console box 30 when a side collision occurs, the airbags 76, 78, 80 are inflated and expanded between the console box 30 which is about to rotate to the retraction position and the head H or the like so as to protect the head H or the like. In the meantime, if the console box 30 is so constructed that a guide cloth 84 is set on the outer peripheral portion of the door portion 30A of the console box 30 like a modification 82 shown in FIG. 7 so that the guide cloth 84 is extended by the inflation and expansion of the airbag 78, the airbags 76, 80 on both sides may be omitted.

Fourth Embodiment

Figure 8:
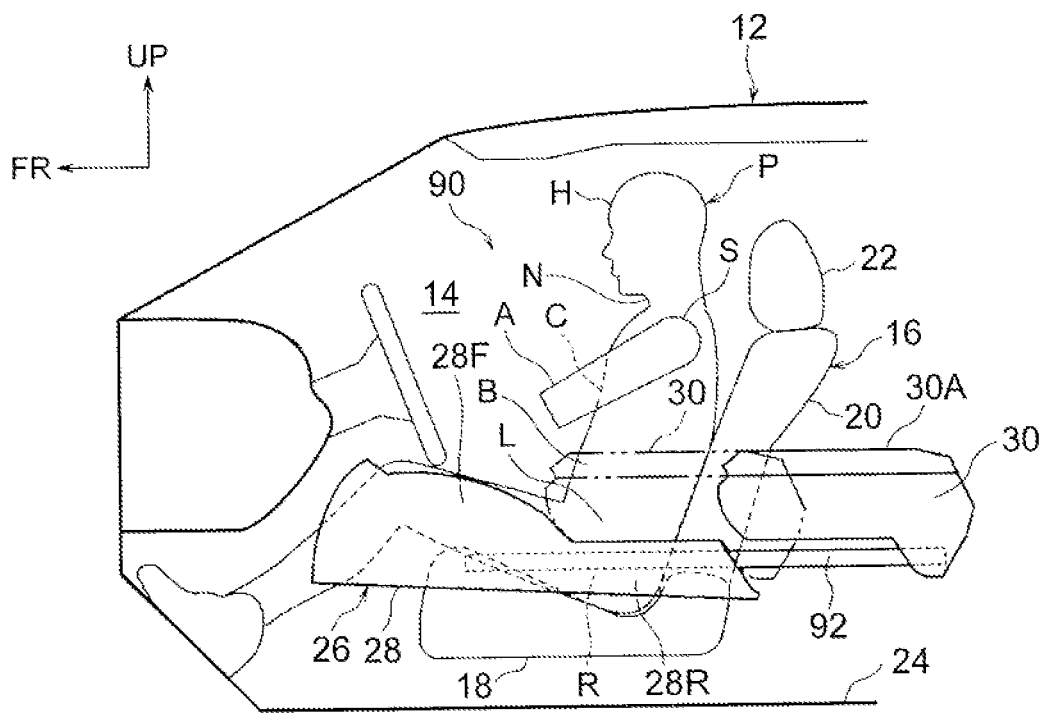
FIG. 8 is a longitudinal sectional view of a structure of a vehicle compartment front portion of a vehicle to which an occupant protection device for a case of a vehicle side collision according to a fourth embodiment of the present invention is applied when viewed from the left side of the vehicle or a diagram corresponding to FIG. 2.

FIG. 8 shows a structure of a vehicle compartment front portion of the automobile 12 to which an occupant protection device for a case of a vehicle side collision 90 according to the fourth embodiment of the present invention is applied through a longitudinal sectional view when viewed from the left side of the vehicle. In the present embodiment, the console box 30 is connected to the console main body portion 28 via a slide rail 92. The longitudinal direction of the slide rail 92 is along the front-rear direction of the vehicle and the console box 30 is movable (slideably) with respect to the console main body portion 28 between the normal position indicated with a two-dot dash line in FIG. 8 and the retraction position indicated with a solid line in FIG. 8. When the console box 30 is moved from the normal position to the retraction position, the slide rail 92 is extended backward of the vehicle.

The console box 30 located at the normal position is restrained at the normal position by a similar locking device to the locking device 40 according to the first embodiment and urged to the retraction position by a spring (not shown). Then, when the above-mentioned locking device is released by the side collision ECU 42, the console box 30 is moved to the retraction position by the urging force of the spring. When the console box 30 reaches the retraction position, the console box 30 is restrained from moving to the normal position side by a locking mechanism provided on the slide rail 92. The console box 30 is configured not to oppose the occupant P in the vehicle width direction in a state in which the console box 30 is located at the retraction position. Other structure than the above-described one is the same as the above-described first embodiment. The present embodiment also can contribute to improvement of occupant protection performance like the first embodiment.

Fifth Embodiment

Figure 9:
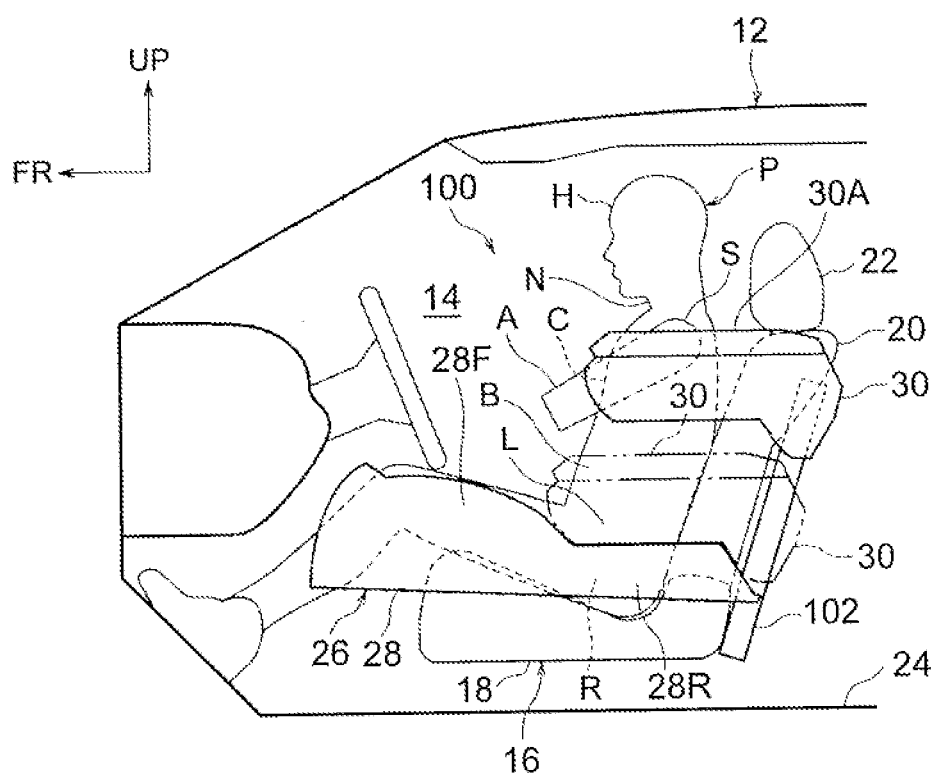
FIG. 9 is a longitudinal sectional view of a structure of a vehicle compartment front portion of a vehicle to which an occupant protection device for a case of a vehicle side collision according to a fifth embodiment of the present invention is applied when viewed from the left side of the vehicle or a diagram corresponding to FIG. 2.

FIG. 9 shows a structure of a vehicle compartment front portion of the automobile 12 to which an occupant protection device for a case of a vehicle side collision 100 according to the fifth embodiment of the present invention is applied through a longitudinal sectional view when viewed from the left side of the vehicle. In the present embodiment, the console box 30 is connected to the console main body portion 28 via a slide rail 102. The longitudinal direction of the slide rail 102 is along the height direction of the seat back 20 and the console box 30 is movable (slideably) with respect to the console main body portion 28 between a normal position indicated with a two-dot dash line in FIG. 9 and a retraction position indicated with a solid line in FIG. 9. In a state in which the console box 30 is located at the retraction position, the console box 30 never opposes the abdomen B of the occupant P in the vehicle width direction but opposes the shoulder S of the occupant P in the vehicle width direction. Other structure than the above-described one is the same as the above-described fourth embodiment. The present embodiment can obtain the same effect as the above-described second embodiment.

Sixth Embodiment

Figure 10:
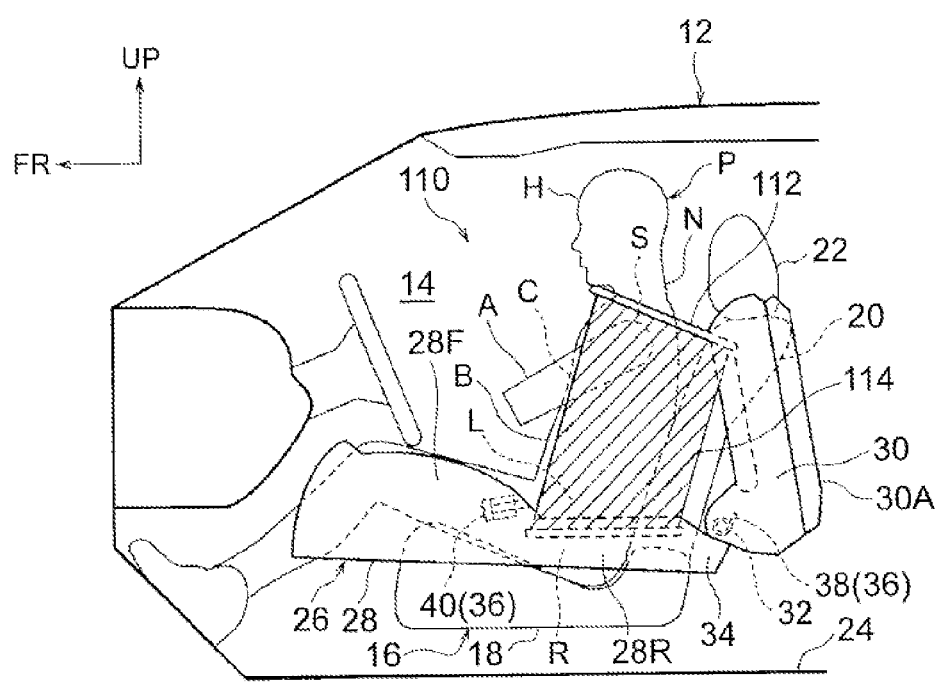
FIG. 10 is a longitudinal sectional view of a structure of a vehicle compartment front portion of a vehicle to which an occupant protection device for a case of a vehicle side collision according to a sixth embodiment of the present invention is applied when viewed from the left side of the vehicle or a diagram corresponding to FIG. 2.

FIG. 10 shows a structure of a vehicle compartment front portion of the automobile 12 to which an occupant protection device for a case of a vehicle side collision 110 according to the sixth embodiment of the present invention is applied through a longitudinal sectional view when viewed from the left side of the vehicle. In the present embodiment, when the console box 30 is moved to the retraction position, a protective cloth 114 (extension member) is extended between a rotation bar 112 provided on the console box 30 and the rear portion 28R of the console main body portion 28 (state indicated in FIG. 10). The protective cloth 114 opposes the occupant P (here, a range from the shoulder S to the waist L) from the central side in the vehicle width direction. In the meantime, in FIG. 10, the protective cloth 114 is hatched to facilitate understanding of the shape of the protective cloth 114. This is the same in FIG. 11, FIG. 18 and FIG. 19 also.

The above-described rotation bar 112 is so constructed that an end portion in the longitudinal direction is connected to the right end portion of the front end portion of the console box 30 and rotatable about its axis along the vehicle width direction with respect to the console box 30. Although the rotation bar 112 is arranged along the bottom face of the console box 30 at a normal time, when the console box 30 is moved to the retraction position, it is moved to a position indicated in FIG. 10 by an urging member (not shown). Other structure is the same as the first embodiment. In the present embodiment, an occupant P moved by inertia to the central side in the vehicle width direction by an impact of a side collision can be restrained from the shoulder S to the waist L by the protective cloth 114 thereby further contributing to improvement of the occupant protection performance.

Seventh Embodiment

Figure 11:
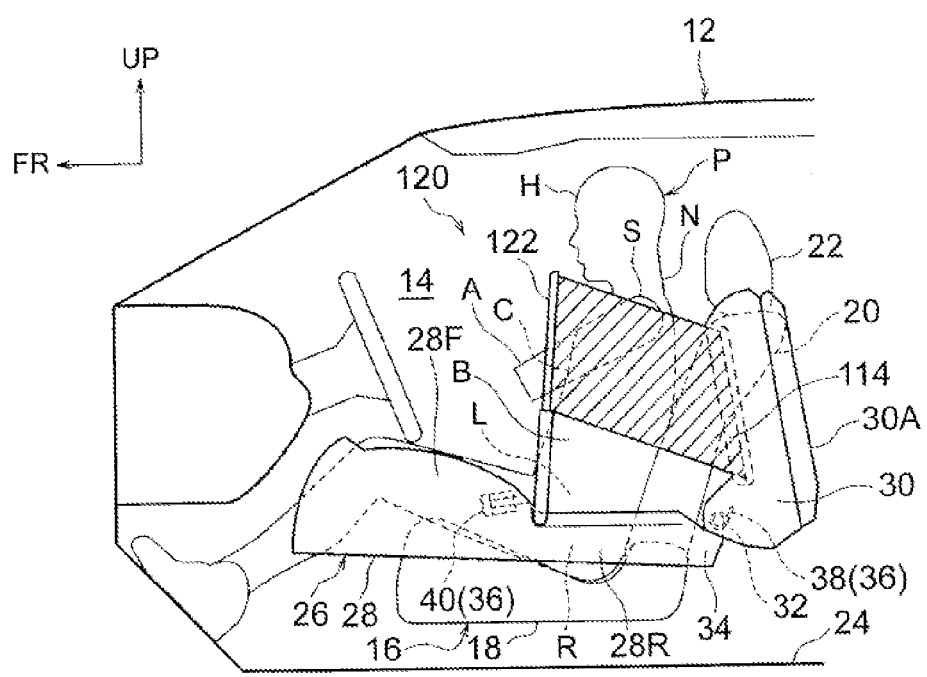
FIG. 11 is a longitudinal sectional view of a structure of a vehicle compartment front portion of a vehicle to which an occupant protection device for a case of a vehicle side collision according to a seventh embodiment of the present invention is applied when viewed from the left side of the vehicle or a diagram corresponding to FIG. 2.

FIG. 11 shows a structure of a vehicle compartment front portion of the automobile 12 to which an occupant protection device for a case of a vehicle side collision 120 according to the seventh embodiment of the present invention is applied through a longitudinal sectional view when viewed from the left side of the vehicle. Although the present embodiment includes a rotation bar 122 which is similar to the rotation bar 112 according to the sixth embodiment, the rotation bar 122 is mounted rotatably on the right end portion of the front end portion of the rear portion 28R of the console main body portion 28 so that it can be extended/contracted (FIG. 11 shows a state in which the rotation bar 122 has been extended). Further, the protective cloth 114 which is extended between the rotation bar 122 and the console box 30 is firmed so as to restrain the shoulder S and the chest C of the occupant P. Other structure is the same as the above-described sixth embodiment. The present embodiment can restrain the shoulder S and the chest C of the occupant P moved by inertia to the central side in the vehicle width direction by an impact of a side collision by means of the protective cloth 114, thereby further contributing to improvement of the occupant protection performance.

Eighth Embodiment

Figure 12:
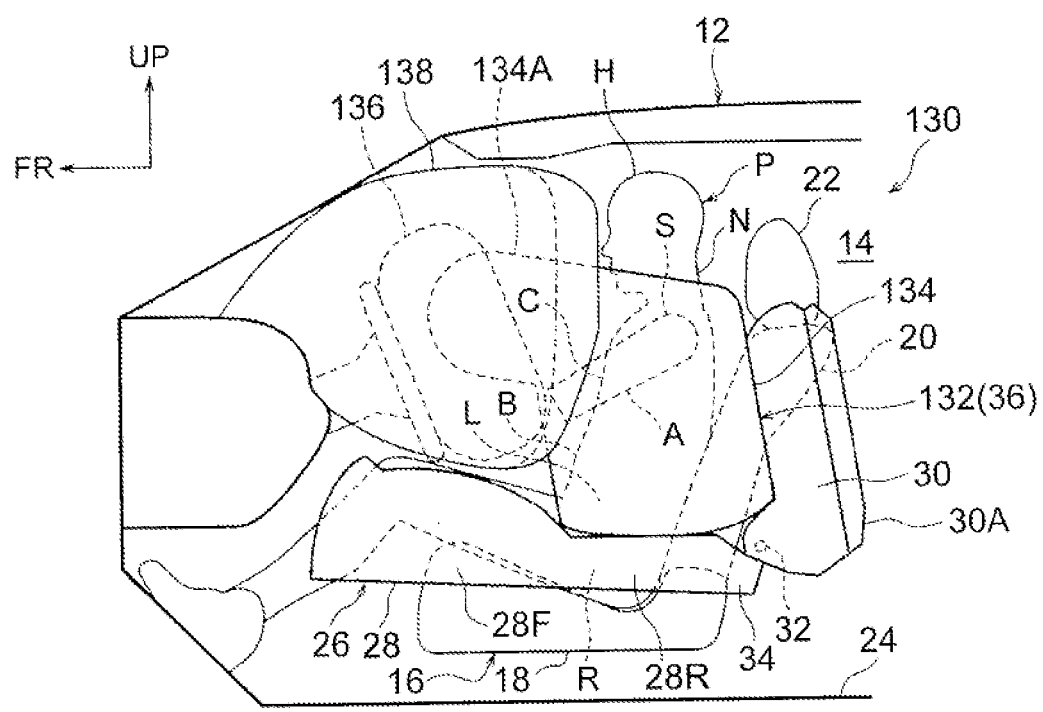
FIG. 12 is a longitudinal sectional view of a structure of a vehicle compartment front portion of a vehicle to which an occupant protection device for a case of a vehicle side collision according to an eighth embodiment of the present invention is applied when viewed from the left side of the vehicle or a diagram corresponding to FIG. 2.

FIG. 12 shows a structure of a vehicle compartment front portion of the automobile 12 to which a occupant protection device for a case of a vehicle side collision 130 according to the eighth embodiment of the present invention is applied through a longitudinal sectional view when viewed from the left side of the vehicle. In the present embodiment, the moving device 36 includes a console airbag device 132 instead of the helical coil spring 38 and the locking device 40 according to the first embodiment. The console airbag device 132 includes a console airbag 134 which is accommodated between the console main body portion 28 and the console box 30 in a folded state at the normal time and an inflator (not shown) which generates gas inside the console airbag 134. The above-described inflator is activated when the side collision ECU 42 detects or predicts that the left side portion of the automobile 12 undergoes the side collision. As a result, when the console airbag 134 is inflated and expanded, the console box 30 is moved from the normal position to the retraction position (state shown in FIG. 12).

The console airbag 134 is formed to restrain a part of the occupant P from the shoulder S to the waist L when it is inflated and expanded. A forward projecting portion 134A projects forward of the vehicle from a top portion of the inflated and expanded console airbag 134. As shown in FIG. 12, the forward projecting portion 134A is sandwiched between a driver's seat airbag 136 and a passenger seat airbag 138. The driver's seat airbag 136 and the passenger seat airbag 138 are well-known airbags which are inflated and expanded when the side collision ECU 42 detects or predicts a side collision. Other structure than the above-described one is the same as the above-described first embodiment.

In the present embodiment, the occupant P moved by inertia to the central side in the vehicle width direction due to an impact of a side collision can be restrained from the shoulder S to the waist L by the console airbag 134 thereby further contributing to improvement of the occupant protection performance. Further, because the forward projecting portion 134A of the console airbag 134 is sandwiched between the driver's seat airbag 136 and the passenger seat airbag 138, the driver's seat airbag 136 and the passenger seat airbag 138 can be used as a reaction force surface of the console airbag 134. Further, a position of the console airbag 134 with respect to the center console 26 can be stabilized. Further because the console airbag device 132 is used as a part of the moving device for moving the console box 30 to the retraction position at the same time, the structure of the console airbag device can be simplified compared to a case where a special moving device is provided separately from the console airbag device 132.

Ninth Embodiment

Figure 13:
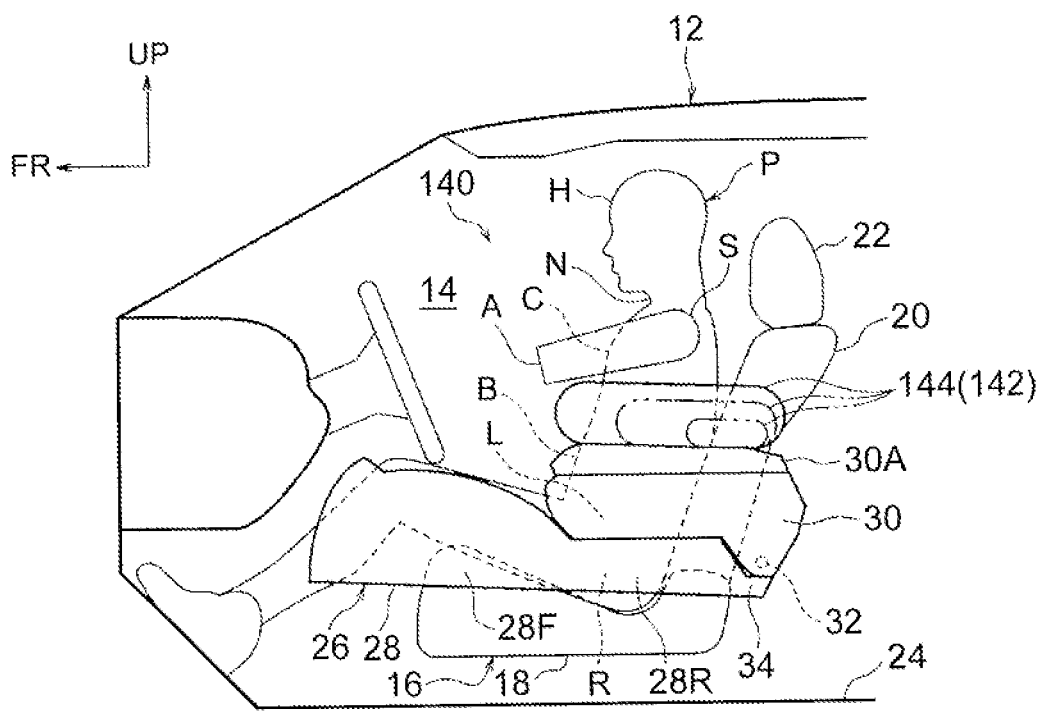
FIG. 13 is a longitudinal sectional view of a structure of a vehicle compartment front portion of a vehicle to which an occupant protection device for a case of a vehicle side collision according to a ninth embodiment of the present invention is applied when viewed from the left side of the vehicle or a diagram of a state in which the console box is located at a normal position.

FIG. 13 shows a structure of a vehicle compartment front portion of the automobile 12 to which a occupant protection device for a case of a vehicle side collision 140 according to the ninth embodiment of the present invention is applied through a longitudinal sectional view when viewed from the left side of the vehicle. Although the present embodiment has the same structure as the above-described eighth embodiment, an airbag device 142 is provided on the door portion 30A of the console box 30. The airbag device 142 includes an airbag 144 which is inflated and expanded from the top surface of the door portion 30A like the airbag device 72 according to the third embodiment. The airbag 144 is inflated and expanded to the front portion side from the rear portion side of the door portion 30A so as to displace (sweep) the upper arm A of the occupant P forward of the vehicle from backward of the vehicle. As a result, the same effect as the third embodiment can be obtained.

Figure 14:
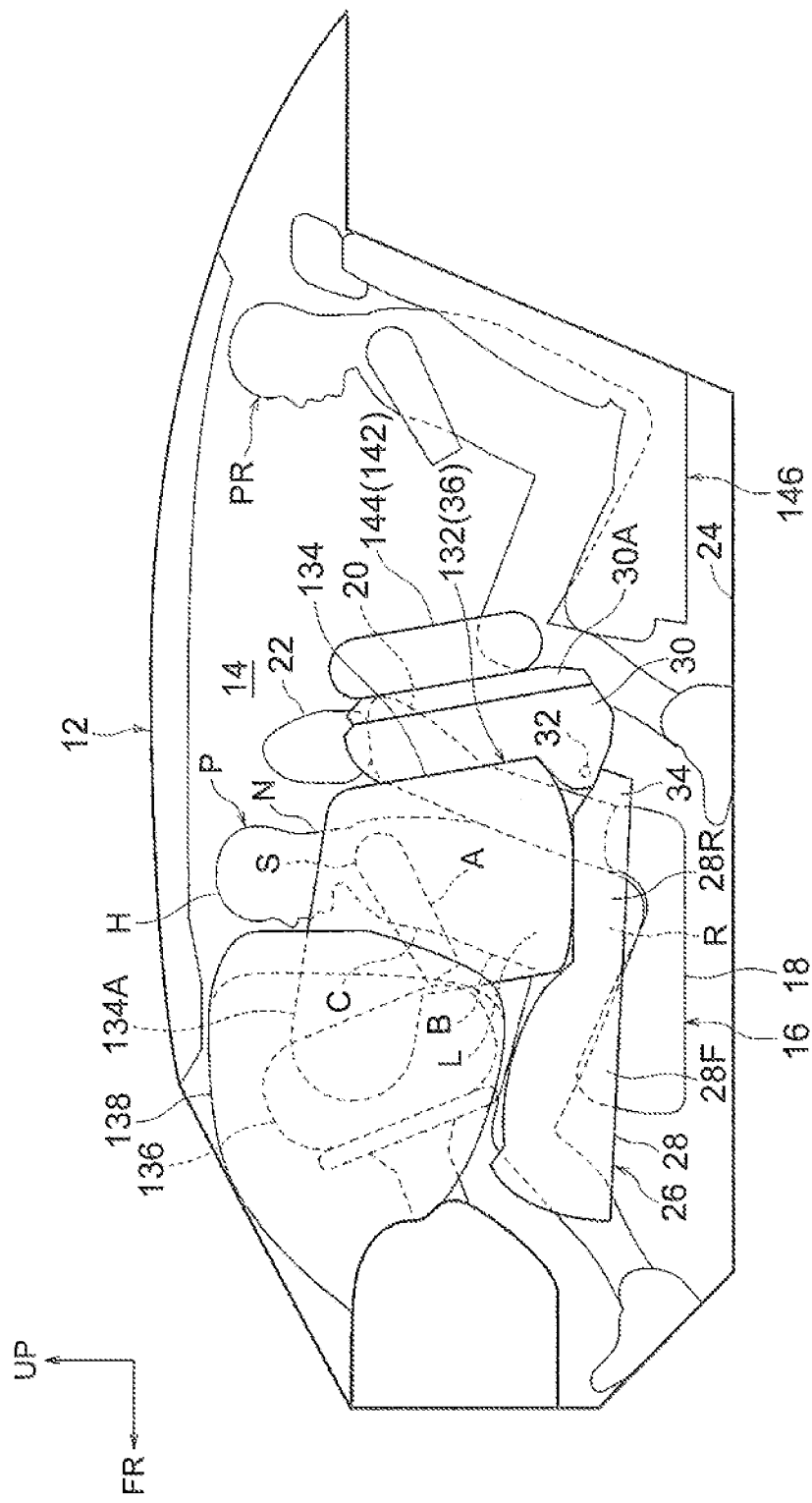
FIG. 14 is a longitudinal sectional view of a structure of a vehicle compartment of a vehicle to which the occupant protection device according to the ninth embodiment of the present invention is applied when viewed from the left side of the vehicle or a diagram of a state in which the console box is located at a retraction position.

Further, in the present embodiment, under a state in which the console airbag 134 is inflated and expanded like the eighth embodiment so that the console box 30 is moved to the retraction position, the airbag 144 of the door portion 30A is directed to the rear seat 146 (vehicular seat) side as shown in FIG. 14. Thus, as a structure for protecting an occupant PR (occupant seated in the rear seat) on the rear seat 146 when the automobile 12 undergoes a front collision, the console box 30 and the airbag 144 can be used. This is the same as the above-described third embodiment. In the meantime, in the sixth to eighth embodiments, the console box 30 can be used for protecting the occupant PR.

Tenth Embodiment

Figure 15:
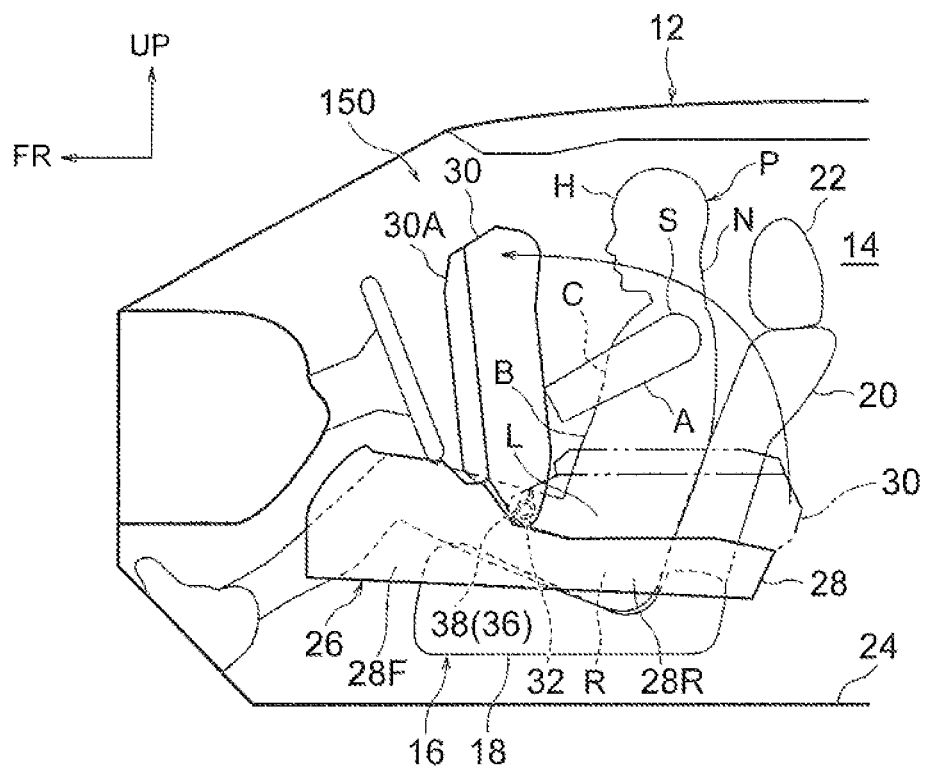
FIG. 15 is a longitudinal sectional view of a structure of a vehicle compartment front portion of a vehicle to which an occupant protection device for a case of a vehicle side collision according to a tenth embodiment of the present invention is applied when viewed from the left side of the vehicle or a diagram corresponding to FIG. 2.

FIG. 15 shows a structure of a vehicle compartment front portion of the automobile 12 to which an occupant protection device for a case of a vehicle side collision 150 according to the tenth embodiment of the present invention is applied through a longitudinal sectional view when viewed from the left side of the vehicle. In the present embodiment, the front end portion of the console box 30 is connected rotatably to the front end portion of the rear portion 28R of the console main body portion 28 via the connecting shaft 32. The console box 30 is rotatable with respect to the console main body portion 28 between a normal position indicated with a two-dot dash line in FIG. 15 and a retraction position indicated with a solid line in FIG. 15. In the meantime, a similar locking device to the locking device 40 according to the first embodiment is provided at a rear end portion of the rear portion 28R although not shown. Other structure than the above-described one is the same as the first embodiment.

The present embodiment also can contribute to improvement of the occupant protection performance like the above-described first embodiment. Further, when the console box 30 rotating to the retraction position interferes with the arm A of the occupant P, the upper arm A can be swept forward of the vehicle from backward of the vehicle. Thus, from a viewpoint of inhibiting a rotation of the console box 30 from being blocked carelessly, the present embodiment is more preferable than the first embodiment. Further, because the console box 30 rotates to a side in which no occupant exists, the degree of freedom in setting the rotation speed of the console box 30 can be increased.

Figure 16:
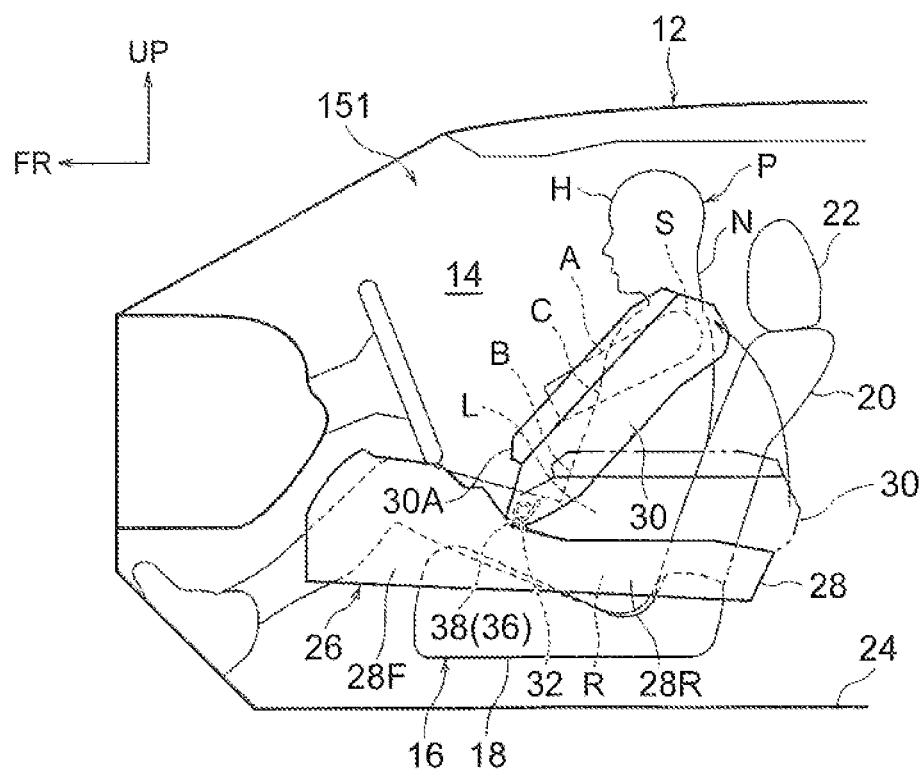
FIG. 16 is a longitudinal sectional view of a structure of a vehicle compartment front portion of a vehicle to which a first modification of the occupant protection device according to the tenth embodiment of the present invention is applied when viewed from the left side of the vehicle or a diagram corresponding to FIG. 2.

In the meantime, like a first modification 151 shown in FIG. 16, the retraction position of the console box 30 may be set such that the console box 30 located at the retraction position opposes the shoulder S of the occupant P in the vehicle width direction. As a result, a similar operation and effect to the above-described second embodiment can be obtained.

Figure 17:
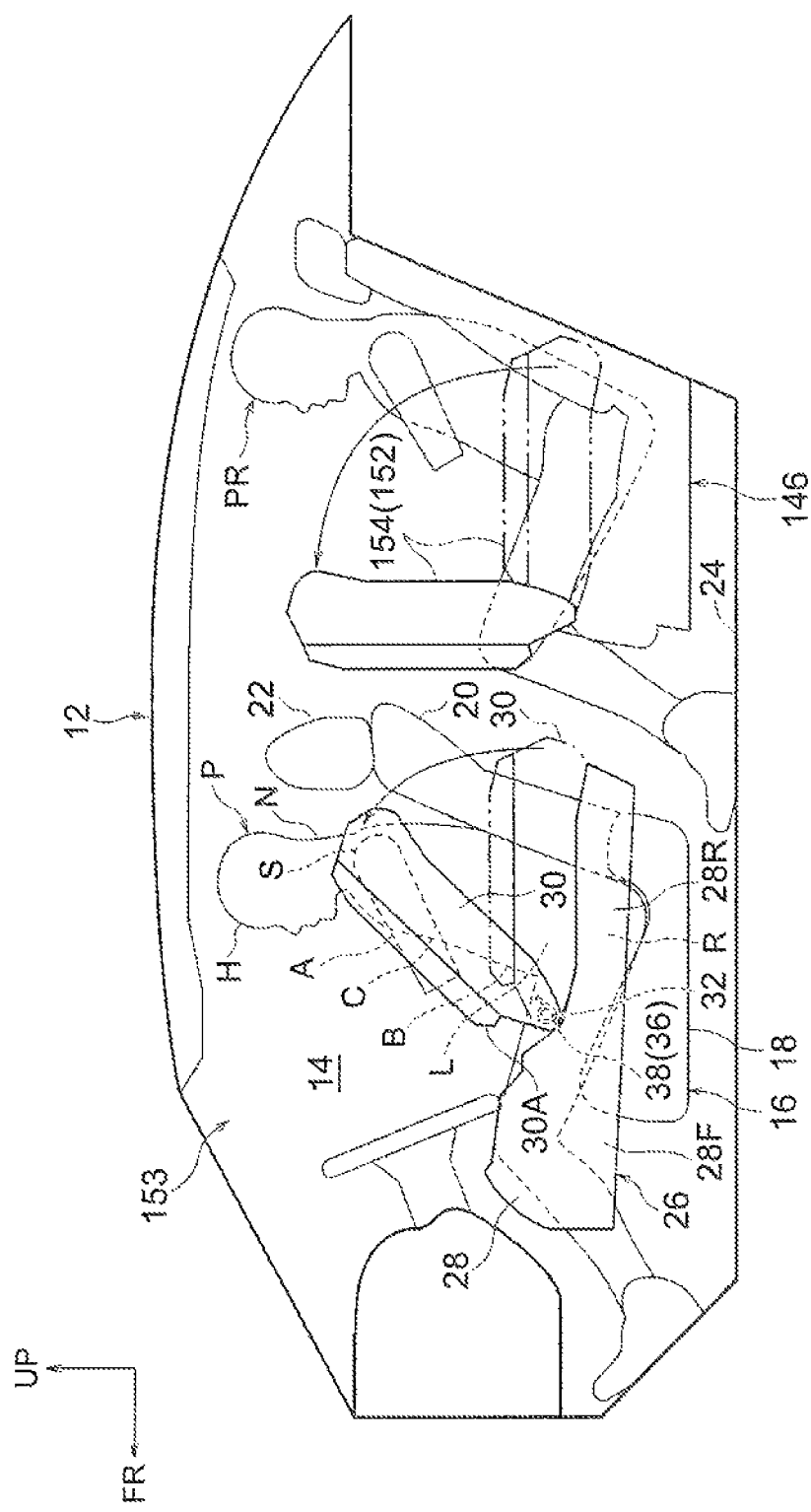
FIG. 17 is a longitudinal sectional view of a structure of a vehicle compartment of a vehicle to which a second modification of the occupant protection device according to the tenth embodiment of the present invention is applied when viewed from the left side of the vehicle or a diagram corresponding to FIG. 14.

Further, in a case where a center console 152 (rear center console) is provided on the side of a rear seat 146, at a central portion in the vehicle width direction of a vehicle compartment 14, the center console 152 may be constructed like the center console 26 according to the tenth embodiment. That is, the center console 152 may be divided to the console box 154 and a fixing portion not shown) and the console box 154 may be constructed to be moved from a normal position indicated with a two-dot dash line in FIG. 17 to a retraction position indicated with the solid line in FIG. 17. As a result, this can contribute to improvement of the occupant protection performance for the occupant PR seated in the rear seat 146.

Figure 18:
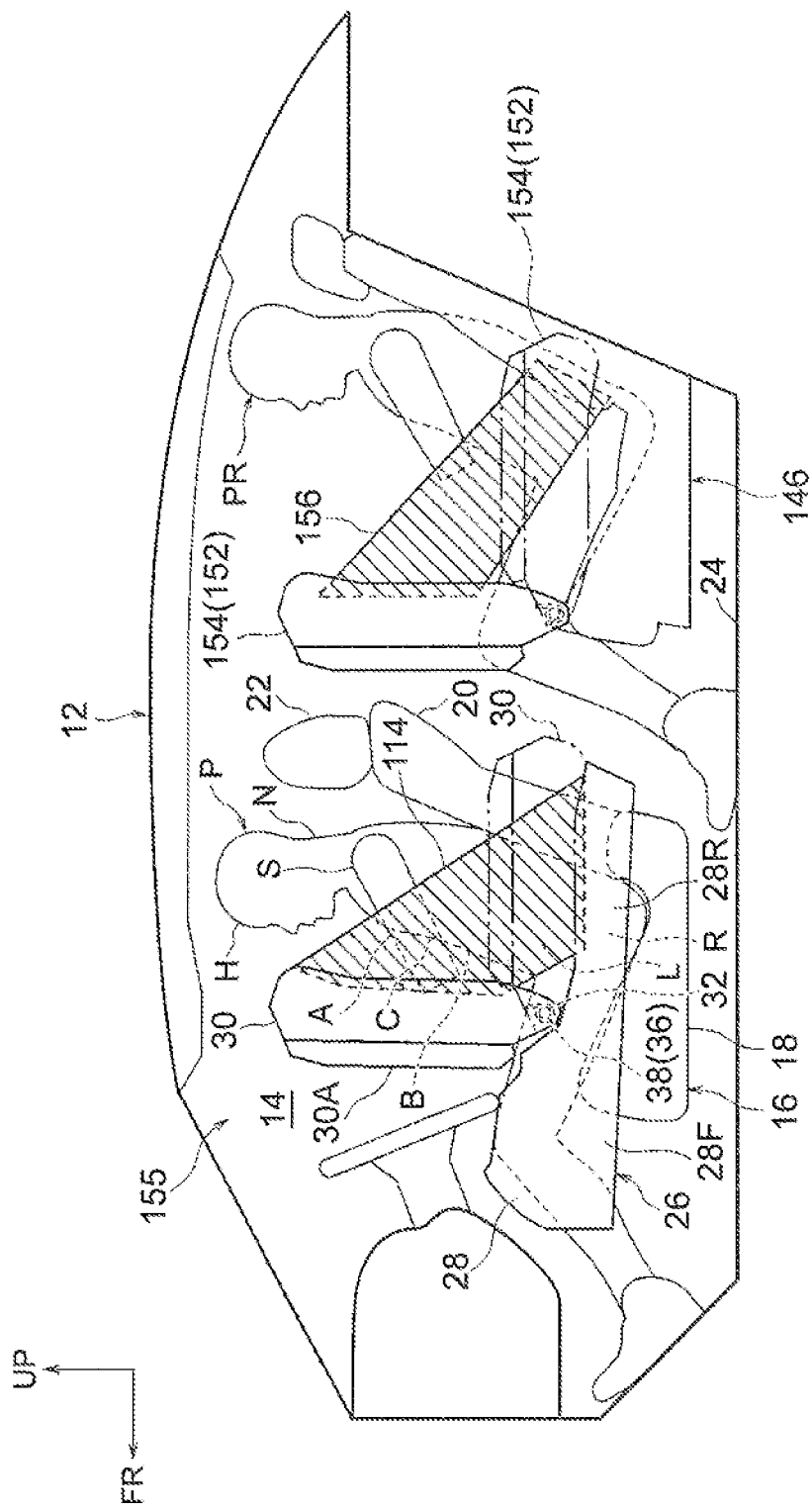
FIG. 18 is a longitudinal sectional view of a structure of a vehicle compartment of a vehicle to which a third modification of the occupant protection device according to the tenth embodiment is applied when viewed from the left side of the vehicle or a diagram corresponding to FIG. 14.

Further, like a third modification 155 shown in FIG. 18, the protective cloth 114 may be extended between the console box 30 moved to the retraction position and the console main body portion 28 while a protective cloth 156 may be extended between the console box 154 moved to the retraction position and a console bottom portion (not shown). As a result, a similar effect to the above-described sixth embodiment can be obtained. Further, like a fourth modification 157 shown in FIG. 19, the protective cloths 114, 156 may be extended each on a higher level. As a result, occupant restraining performance by each of the protective cloths 114 and 156 can be improved.

In the meantime, although in the respective embodiments, the moving device 36 is constructed to move the console box 30 to the retraction position by means of the helical coil spring 38 or the console airbag 134, the present invention is not restricted to this example but the structure of the moving device 36 may be changed appropriately. For example, the moving device may be constructed to move the console box to the retraction position by means of a drive source using a micro gas generator or the like.

Further, although in the above-described respective embodiments, the console main body portion 28 is constructed as a fixing portion of the center console 26, the present invention is not restricted to this example but it is permissible to use just a bracket fixed to the vehicle body floor portion as the fixing portion.

In addition, the present invention can be carried out by being modified in various ways in a range not departing from the gist thereof. Further, it is needless to say that the scope of right of the present invention is not restricted to the above-described respective embodiments.

What is claimed is:

1. An occupant protection device for a case of a vehicle side collision, the occupant protection device comprising:
   a center console that is provided on a side of a vehicular seat and at a central portion of a vehicle compartment in a vehicle width direction, the center console including a console box; and
   a moving device that is configured to move the console box, wherein the console box is configured to move between a normal position and a retraction position;

the normal position is a position in which the console box is configured to oppose an abdominal region of a seated occupant in the vehicle width direction;

the retraction position is a position in which the console box is configured not to oppose the abdominal region of the seated occupant in the vehicle width direction; and when a vehicle side collision is detected or predicted, the moving device moves the console box from the normal position to the retraction position.

2. The occupant protection device according to claim 1, wherein the center console has a fixing portion fixed to a vehicle body floor portion; and an end portion of the console box in a vehicle front-rear direction is connected rotatably to the fixing portion, the console box being configured to rotate about an axis extending along the vehicle width direction.

3. The occupant protection device according to claim 2, wherein the console box and the fixing portion are connected to each other via a connecting shaft; and the connecting shaft is arranged at a bottom end portion of a rear end portion of the console box in the vehicle front-rear direction and at a rear end portion of the fixing portion in the vehicle front-rear direction.

4. The occupant protection device according to claim 3, wherein the fixing portion includes a stopper mechanism that restricts a rotation of the console box to a rear side of the vehicle when the console box is moved to the retraction position.

5. The occupant protection device according to claim 2, wherein the console box and the fixing portion are connected to each other via a connecting shaft; and the connecting shaft is arranged at a front end portion of the console box in the vehicle front-rear direction and at a rear portion of the fixing portion in the vehicle front-rear direction.

6. The occupant protection device according to claim 1, wherein the center console has a fixing portion fixed to a vehicle body floor portion; and the console box is connected slidably to the fixing portion via a slide rail.

7. The occupant protection device according to claim 6, wherein a longitudinal direction of the slide rail extends along a vehicle front-rear direction.

8. The occupant protection device according to claim 6, wherein a longitudinal direction of the slide rail extends along a height direction of a seat back of the vehicular seat.

9. The occupant protection device according to claim 1, wherein the center console has a fixing portion fixed to a vehicle body floor portion; and the moving device is mounted on a front portion of the fixing portion, the moving device including:

a locking portion that locks the console box located at the normal position;

a driving device that releases a restraint of the locking portion when a side collision is detected or predicted; and an urging member that urges the console box to the retraction position.

10. The occupant protection device according to claim 1, wherein the retraction position is a position where the console box is configured to oppose a shoulder region of the occupant in the vehicle width direction.

11. The occupant protection device according to claim 10, further comprising:

a far side airbag provided on a side portion on a central side of a seat back in the vehicle width direction in the vehicular seat, wherein the far side airbag is interposed between the shoulder region of the occupant and the console box; and the far side airbag is inflated and expanded when the vehicle side collision occurs.

12. The occupant protection device according to claim 1, further comprising:

an airbag device that inflates and expands an airbag from a top surface of the console box when a vehicle side collision is detected or predicted.

13. The occupant protection device according to claim 12, wherein the airbag device has three airbags arranged in line in the vehicle width direction; and an airbag in the center of the vehicle width direction is inflated and expanded higher than the airbags on either side.

14. The occupant protection device according to claim 13, wherein the airbag in the center of the vehicle width direction is inflated and expanded earlier than the airbags on either side.

15. The occupant protection device according to claim 12, wherein the airbag device is activated at a same time or earlier than a time when the moving device is activated.

16. The occupant protection device according to claim 12, wherein a guide cloth is provided on an outer peripheral portion of a top face of the console box, the guide cloth being extended by an inflation and expansion of the airbag.

17. The occupant protection device according to claim 12, wherein the center console is provided on a side portion of a front seat;

the console box is moved to the retraction position on a rear side of the vehicle; and the airbag is provided so as to be directed to a rear seat side when the console box is moved to the retraction position.

18. The occupant protection device according to claim 1, wherein the center console has a fixing portion fixed to a vehicle body floor portion;

the moving device contains a console airbag device;

the console airbag device includes a console airbag which is accommodated between the fixing portion and the console box in a folded state at a normal time; and when the console airbag is inflated and expanded, the console box is moved from the normal position to the retraction position.

19. The occupant protection device according to claim 18, wherein the console airbag has a forward projecting portion which projects forward of the vehicle from a top portion of the vehicle when it is inflated and expanded; and the forward projecting portion is configured to be sandwiched between a driver's seat airbag and a passenger seat airbag.

20. The occupant protection device according to claim 1, further comprising:
   a protective cloth which is extended between the console box, when the console box is in the retraction position, and a fixing portion of the center console fixed to a vehicle body floor portion.

* * * * *